UNITED STATES PATENT OFFICE.

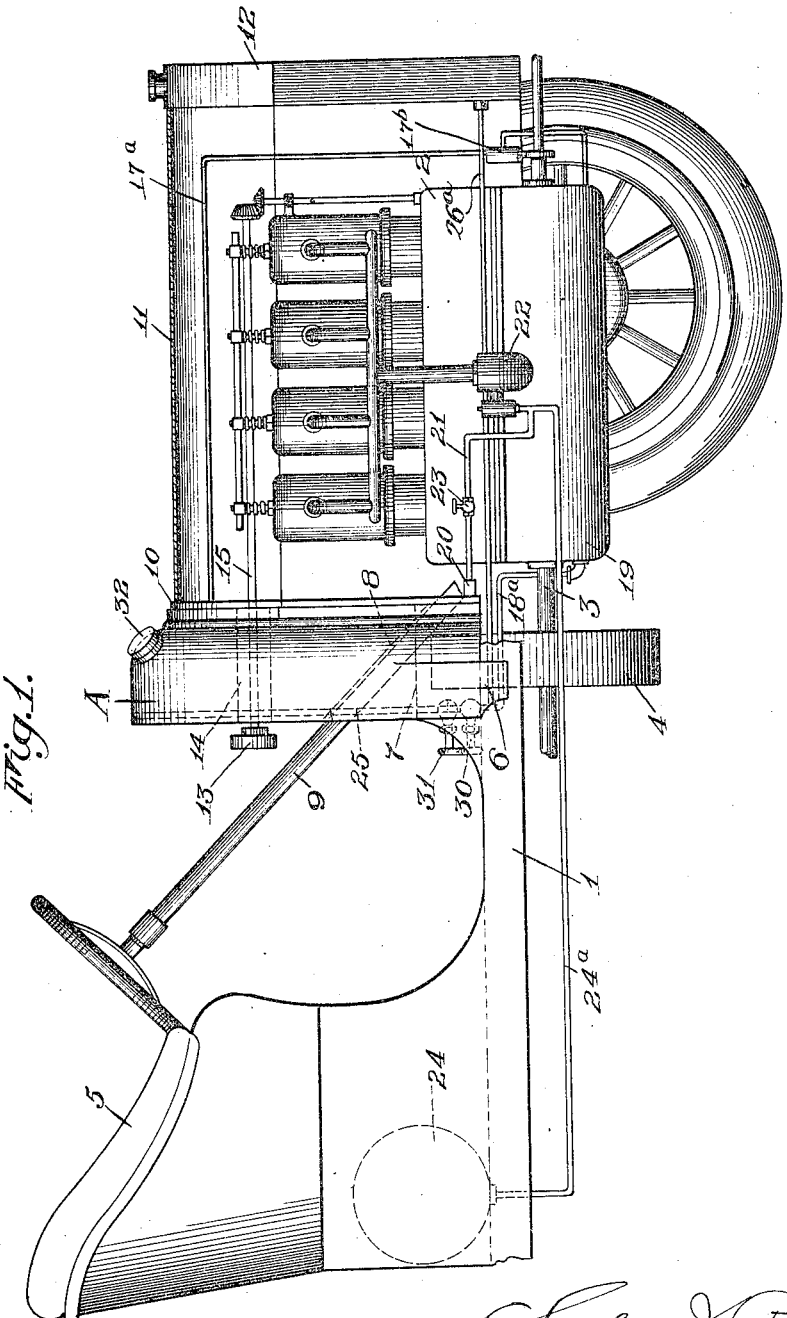

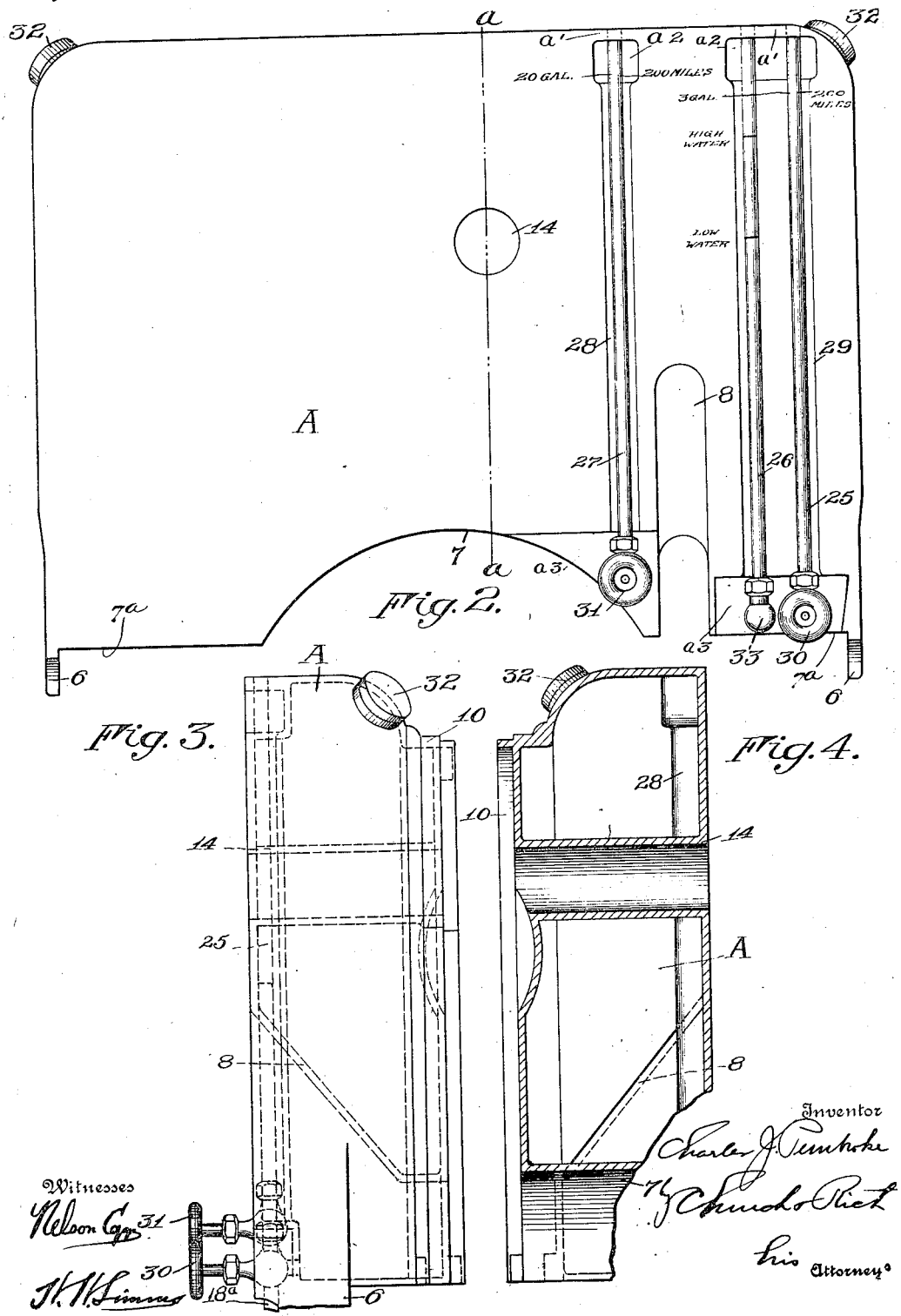

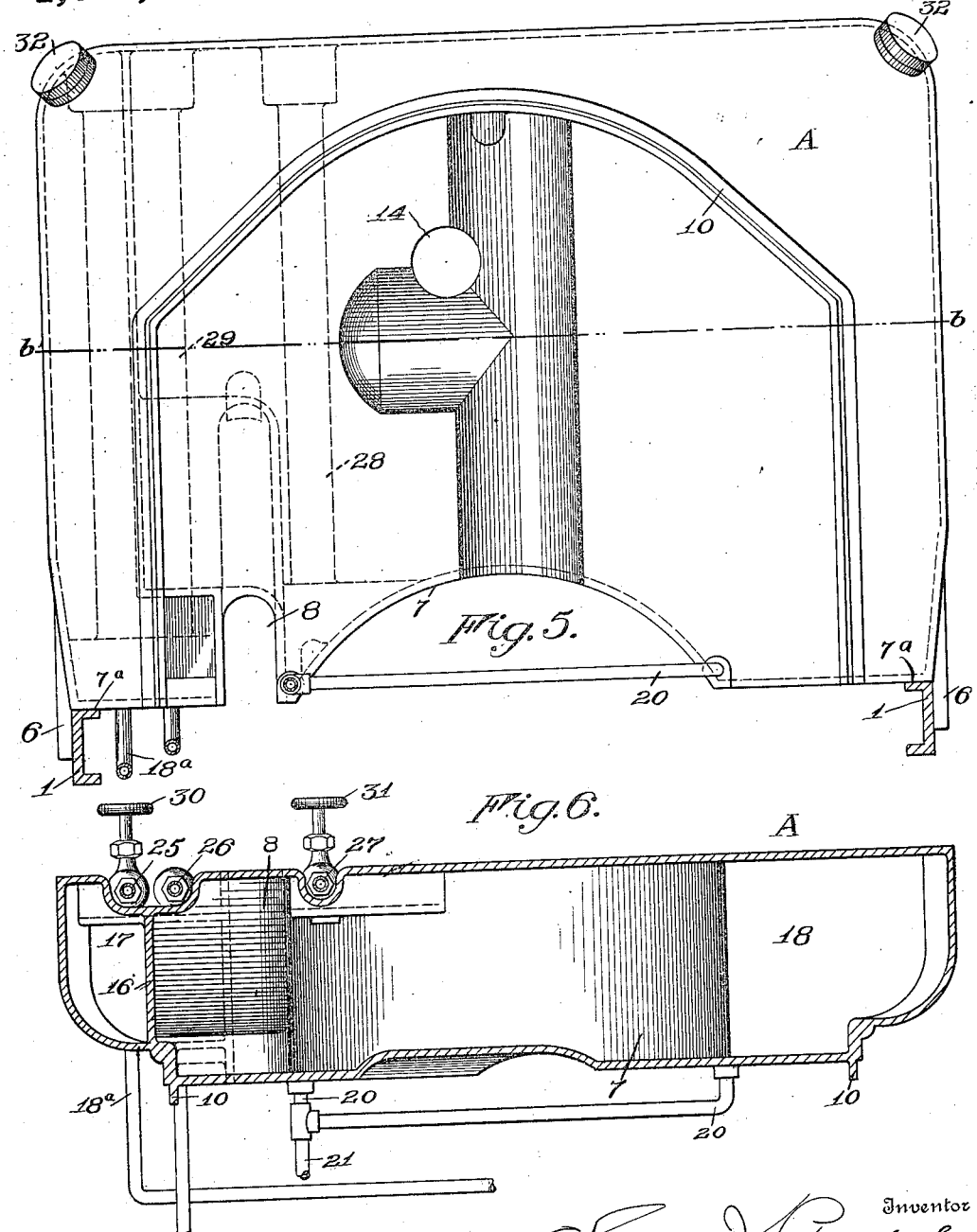

CHARLES J. PEMBROKE, OF ROCHESTER, NEW YORK.

MOTOR-VEHICLE.

1,060,701.　　　　　　Specification of Letters Patent.　　　Patented May 6, 1913.

Application filed October 6, 1909.　Serial No. 521,318.

*To all whom it may concern:*

Be it known that I, CHARLES J. PEMBROKE, of Rochester, in the county of Monroe and State of New York, have invented certain new and useful Improvements in Motor-Vehicles; and I do hereby declare the following to be a full, clear, and exact description of the same, reference being had to the accompanying drawings, forming a part of this specification, and to the reference-numerals marked thereon.

My present invention has for its object to provide an improved form of tank for use in connection with automobiles or motor vehicles adapted to contain the oils or fluids employed in operating the engine which is so constructed that it may be located in front of the operator's seat and used as a dash board for the vehicle.
My invention further consists in providing the combined tank and dash board with gage glasses which being directly in front of the operator are always in view and enable him to determine the quantity thereof without leaving his seat.

To these and other ends the invention consists in certain improvements and combinations of parts all as will be hereinafter more fully described, the novel features being pointed out in the claims at the end of the specification.

In the drawings: Figure 1 is a side view of a vehicle with parts broken away and other parts in section for the purpose of better illustrating the invention. Fig. 2 is a rear view of the tank. Fig. 3 is a side view. Fig. 4 is a vertical section on line $a$—$a$, Fig. 2. Fig. 5 is a front view of the tank, and Fig. 6 is a section on line $b$—$b$, Fig. 5.
In illustrating the present embodiment of my invention, I have shown the device constructed in accordance therewith employed in conjunction with a motor vehicle frame or chassis comprising preferably a pair of longitudinally extending side pieces 1 having the engine 2 supported between them near the front of the frame, the motor shaft 3 of the engine extending longitudinally of the side pieces 1 and carrying a fly wheel 4 at its rear end. The usual body containing the operator's seat 5 is mounted on the chassis in rear of the engine and between the engine 2 and the seat 5 is the combined tank and dash board A. The latter is substantially of the width of the chassis and is securely mounted on the side pieces 1, the desired size or capacity of tank chambers being obtained by the necessary height and thickness, at the same time maintaining its symmetrical appearance as a dash board for the vehicle. Depending at each side of the tank are ears 6 which engage the outer faces of the frame pieces 1, and by means of which it may be bolted to the frame. The lower edge or bottom of the tank is centrally arched or recessed, as indicated at 7, to accommodate the fly wheel 4 or other parts of the driving mechanism, said arch being of any desired radius or length of chord, as may be required, it being important however, that the extreme ends of the bottom be maintained horizontally to form the steps or rests for engaging the side pieces 1 of the frame, as indicated at $7^a$. At one side of the arched portion the bottom is provided with a recess 8, having the rearwardly or upwardly inclined top wall, through which the steering shaft 9 may project.

The front wall of the tank is provided with a flange 10 projecting forwardly therefrom for supporting the rear end of the hood 11 inclosing the engine, the forward end thereof engaging the radiator 12 which may be of any suitable construction.

The tank is preferably made in one integral casting and is divided internally by a wall 16, thus forming a receptacle 17 for lubricating oil and a chamber 18 for the gasolene or motive fluid. Leading from the chamber 17 is a pipe $18^a$ which may be connected to the lubricating system, as shown in the present instance, to the engine crank casing 19. Connected into the top of the chamber 17 is a return pipe $17^a$ leading from the oil pump $17^b$ which it will be understood may be employed in connection with an engine adapted to be lubricated by the splashing of the oil in the crank case, for restoring said oil to the chamber 17. The quantity of lubricating oil flowing to the engine may be regulated by a valve 30 which will be closed when the engine is not in operation and as any excess of oil is returned to the chamber 17 by the pump, a continuous circulation thereof may be had and thorough lubrication obtained at all times.

The receptacle 18 may be used as a main supply tank or it may be used as an auxiliary reservoir in conjunction with another storage tank 24 which latter is connected by a pipe $24^a$ with the carbureter 22. The motive fluid or gasolene is supplied to the carbureter by a feed pipe 21 having the branches 20 communicating with the chamber 18 at opposite sides of the arched bottom 7, and provided with the valve 23.

The rear face of the tank, or the wall facing the driver's seat serves as a support on which may be disposed any of the usual accessories which should be under the control of the operator, such as the timer 13, and to provide for the accommodation of this particular instrument the front and rear walls of the tank are perforated and connected by a horizontal tube 14 through which the timer shaft 15 passes.

A further important feature of my invention resides in providing means such as sight gage glasses for constantly indicating to the operator of the vehicle the respective quantities of the motive fluid, the lubricating oil and the level of the water in the radiator, all of which are directly in front of the operator and are arranged in juxtaposition to enable him to readily observe the relative volumes of these fluids at the same time. The three gage glasses are indicated by 25, 26, and 27, and are located in recesses formed in the rear wall of the tank of sufficient depth to protect the glasses from injury and by countersinking them within the face of the wall the passageway to the operator's seat is not restricted. Another advantage is secured by this arrangement of the parts, as it provides a simple means of mounting the glass tubes in place as their upper ends may be inserted in small sockets formed in the portion $a'$ of the top of the tank which overhangs said recesses, the latter at their upper ends being enlarged as indicated at $a^2$ to provide finger spaces for facilitating the insertion and removal of the tubes. At the lower ends of the recesses insets $a^3$ of greater depth are also provided to accommodate the gage glass fittings or valves 30, 31 and 33, permitting these to be positioned so that only the handles of the valves project over the flooring in front of the operator's seat and in position to be easily adjusted by him.

At the upper corners of the tank are provided apertures, normally closed by screw caps 32, through which the receptacles or chambers 17 and 18 may be filled.

The water gage glass 26 is connected to the radiator by a pipe 26ª and in some instances the glass fitting may be supplied with a valve but ordinarily this is unnecessary as the usual elbow and gland, indicated by 33, affording free access of the water in the circulating system of the engine being sufficient to answer all requirements. The combined tank and dash is sufficient in height to permit the upper end of the tube 26 to extend upwardly above the top of the radiator 12, and thus prevent its overflowing. A gage of this character is particularly advantageous. On account of the peculiar cellular construction of the radiators used on motor vehicles, the operator is unable to determine the level of the water therein, even by removing the filling cap, after the evaporation has been sufficient to lower the level below the top or uppermost row of cells.

In the present embodiment of my invention in which the tank A is employed as an auxiliary or emergency tank, the valve 23 will be normally closed, the gasolene or motive fluid being used from the tank 24. When this is exhausted the valve 23 may be opened, the operator then knowing that the supply of fuel on hand is sufficient to operate the vehicle a given number of miles and the gage glass 27 indicating exactly the quantity in reserve at all times.

In connection with the gage glasses 25 and 27 scales are provided on opposite sides of each, one scale indicating in gallons the quantity of oil, while the other shows the maximum number of miles the vehicle should be capable of traveling on the oil supply indicated. The last mentioned scale should be engraved from data computed from tests of the vehicle and when so made such a scale in conjunction with the one indicating the quantity of oil in gallons and fractions thereof is of valuable assistance to the operator, as it enables him to judge as to the efficiency of the motor.

I claim as my invention:

1. In a motor vehicle comprising side frame pieces, wheels supporting it, a driver's seat mounted on the frame and an engine also located thereon, vehicle driving devices arranged in rear of the engine and steering mechanism comprising a post extending upwardly and rearwardly into proximity with the driver's seat, of a chambered dash located between said seat and engine for containing fluids for operating the engine, said dash embodying front and rear walls and connecting end and top walls and having a bottom wall provided with portions at its ends adapted to engage the frame pieces, said bottom having its central portion elevated to accommodate the driving mechanism of the engine and also having a slotted opening extending upwardly from the bottom for receiving said steering post, and feed pipes leading from the chambers to the engine.

2. The combination with a motor vehicle frame having side pieces, fore and rear wheels supporting said frame, a driver's seat mounted on the frame and an explosive engine arranged in front of the seat having a fly wheel, steering devices for operating the wheels and a steering column extending upwardly and rearwardly into proximity with the driver's seat, of a vehicle dash comprising a hollow body for containing fluid for operating the engine, said body being recessed at its lower side to accommodate the fly wheel of the engine and also provided with a recess to receive the steering column, said recess extending upwardly from the lower side of said body to permit the latter to be applied or removed from the vehicle frame without disturbing the steering column.

3. The combination with a motor vehicle frame having side pieces, fore and rear wheels supporting said frame, a driver's seat mounted on the frame and an explosive engine arranged in front of the seat having a fly wheel, steering devices for operating the wheels and a steering column extending upwardly and rearwardly into proximity with the driver's seat, of a hollow body located between the seat and engine composed of front and rear walls spaced apart and top, bottom and side walls connecting them, and a division wall forming a plurality of compartments in said body for containing the fluids employed for operating the engine, the front wall facing the driver's seat being provided with vertically extending recesses, and said bottom wall being provided with upwardly extending recesses adapted to accommodate the fly wheel and steering column, and gage glasses supported on said body and arranged in the recesses in the front wall in communication with the compartments of the body.

4. The combination with a motor vehicle frame having side pieces, fore and rear wheels supporting said frame, a driver's seat mounted on the frame and an explosive engine arranged in front of the seat having a fly wheel, steering devices for operating the wheels and a steering column extending upwardly and rearwardly into proximity with the driver's seat, of a hollow body located between the seat and engine composed of front and rear walls spaced apart and slotted at their lower edges, and top, bottom and side walls connecting them, said bottom wall being adapted to rest at its ends upon the side pieces of the frame and having portions extending upwardly and coöperating with said slots in the front and rear walls to form a recess for accommodating the steering column, and lugs depending from the side walls and adapted to be secured to the side pieces of the frame.

CHARLES J. PEMBROKE.

Witnesses:
RUSSELL B. GRIFFITH,
NELSON COPP.